April 9, 1968 K. H. RENSHAW 3,377,560

DIRECT DATA SAMPLE SINGLE TONE RECEIVER

Filed Jan. 13, 1964 2 Sheets-Sheet 1

INVENTOR.
KENNETH H. RENSHAW
BY
Moody and Phillion
ATTORNEYS

INVENTOR.
KENNETH H. RENSHAW

BY Moody and Phillion

ATTORNEYS

United States Patent Office 3,377,560

Patented Apr. 9, 1968

3,377,560

DIRECT DATA SAMPLE SINGLE TONE RECEIVER

Kenneth H. Renshaw, Costa Mesa, Calif., assignor to Collins Radio Company, Cedar Rapids, Iowa, a corporation of Iowa Filed Jan. 13, 1964, Ser. No. 337,478
4 Claims. (Cl. 325—320)

ABSTRACT OF THE DISCLOSURE

Means for decoding an FSK signal employing one-half cycle frequency $f_1$ for a space and a full cycle of frequency $2f_1$ for a mark, by sampling the signal at each bit transition time to produce a train of positive and negative samplings.

In essence, the pulse train is delayed one bit period and then compared with the undelayed train. Coincidence indicates a mark and non-coincidence indicates a space.

This invention relates generally to frequency shift keyed (FSK) receivers and, more specifically, to a receiver for decoding a particular type FSK signal by an improved direct sampling data technique.

One form of communicating intelligence is to encode the intelligence in binary form and then represent the marks and spaces by two different frequencies. The transmission of the intelligence can be in a time synchronous manner in which each data bit occupies an interval of time equal to that occupied by every other data bit with the time intervals occurring consecutively. One form of FSK encoding has been the use of a half cycle of one frequency and a full cycle of another frequency, one-half that of the first frequency, to designate marks and spaces. For example, the full cycle can designate a mark and the half cycle can designate a space. When the full cycle designating a mark occurs, there will be no change of potential over the entire full cycle, i.e., the potential of the full cycle will be the same at the end as at the beginning thereof. Thus, if the full cycle begins at a negative or positive peak, it will end at a negative or positive peak. However, the half cycle representing a space will result in a change of polarity over the occurrence of the half cycle (assuming the half cycle to begin at a positive or negative peak). It is this characteristic of a change in polarity for a half cycle and a lack of change of polarity for a full cycle that is employed to decode the FSK signal and to determine whether a mark or a space is represented during any bit period. By causing the transition from one frequency to another at peak voltages, either positive or negative, the transition between the frequencies is smooth and provides a minimum of distortion. A system for generating an FSK signal of this type is described in detail in United States Patent 3,102,-238 issued Aug. 27, 1963 to Lynn R. Bosen, entitled "Encoder With One Frequency Indicating One Binary Logic State and Another Frequency Indicating Other State," incorporated by reference herein.

One system which has been developed for decoding such an FSK signal is described in co-pending application Ser. No. 150,786, filed Nov. 7, 1961, entitled "Single Tone Data Receiver," by Kenneth H. Renshaw and incorporated herein by reference. Such application is believed to constitute the closest prior art to the present invention. In such co-pending application the information is decoded generally by first heterodyning the received FSK signal to a higher frequency and then supplying the heterodyned signal into a balanced discriminator which functions to produce an output signal which rises and falls between two levels with one level representing marks and the other level representing spaces. Such output signal is then sampled and the samplings supplied to a flip-flop circuit which responds thereto to assume one or the other of its two states, thus producing a two-level binary signal representing the marks and spaces contained in the received FSK signal. In such prior art, however, it will be noted that it was necessary to heterodyne the received FSK signal to a higher frequency and then to pass it through a balanced discriminator in order to produce a two-level signal which could be sampled with the samplings, and then be employed to drive a flip-flop circuit.

An object of the present invention is to provide an FSK receiver which is less expensive and simpler than FSK signal receivers of the prior art.

A second purpose of the invention is to provide an FSK signal receiver which will sample the received FSK signal directly without the necessity of heterodyning it to a higher frequency and then passing it through a balanced discriminator.

A third aim of the invention is the improvement of FSK signal receivers, generally.

In accordance with the present invention, the received FSK signal is supplied to a means for extracting a synchronizing signal therefrom and also is supplied to a sampling or gating circuit. The synchronizing signal is employed to generate sampling pulses which are also supplied to said sampling circuit to sample the received FSK signal at the beginning of each data bit. The beginning of one data bit period, of course, is the end of the preceding bit.

Thus, a series of samplings will be obtained. If the bit being sampled is a mark, then the polarity of a sampling at the beginning and end of such bit will be the same, i.e., either positive or negative. On the other hand, if the polarity of the samplings at the beginning and of any given bit change, the presence of a space is indicated. Means are supplied to separate the positive samplings from the negative samplings and to supply them to the set and reset inputs of a toggle switch or a flip-flop circuit. A second toggle switch or flip-flop circuit is responsive to the first flip-flop circuit to store therein the condition of the first flip-flop circuit during the immediately preceding bit period. Thus, if the states of the two toggle switches are the same, this indicates that no change in polarity has occurred and that a mark has just been received. If the states of the two toggle switches are different, a change of polarity has occurred indicating that a space has just been received. An exclusive OR circuit is responsive to the set outputs of the two toggle switches and functions to indicate whether the conditions of the two toggle switches are the same or different, and thereby produce a two-level binary signal containing the data of the received FSK signal.

In accordance with a particular feature of the invention there is required no heterodyning of the received FSK signal to a higher signal and no need for a balanced discriminator, as in the prior art. The received FSK signal is sampled directly, thus resulting in a less expensive and more reliable FSK type receiver.

The aforementioned objects and features of the invention will be more fully understood from the following detailed description thereof when read in conjunction with the drawings in which.

Figures 2, 3, 4, 5, 6, 7, 8, 9, 10:
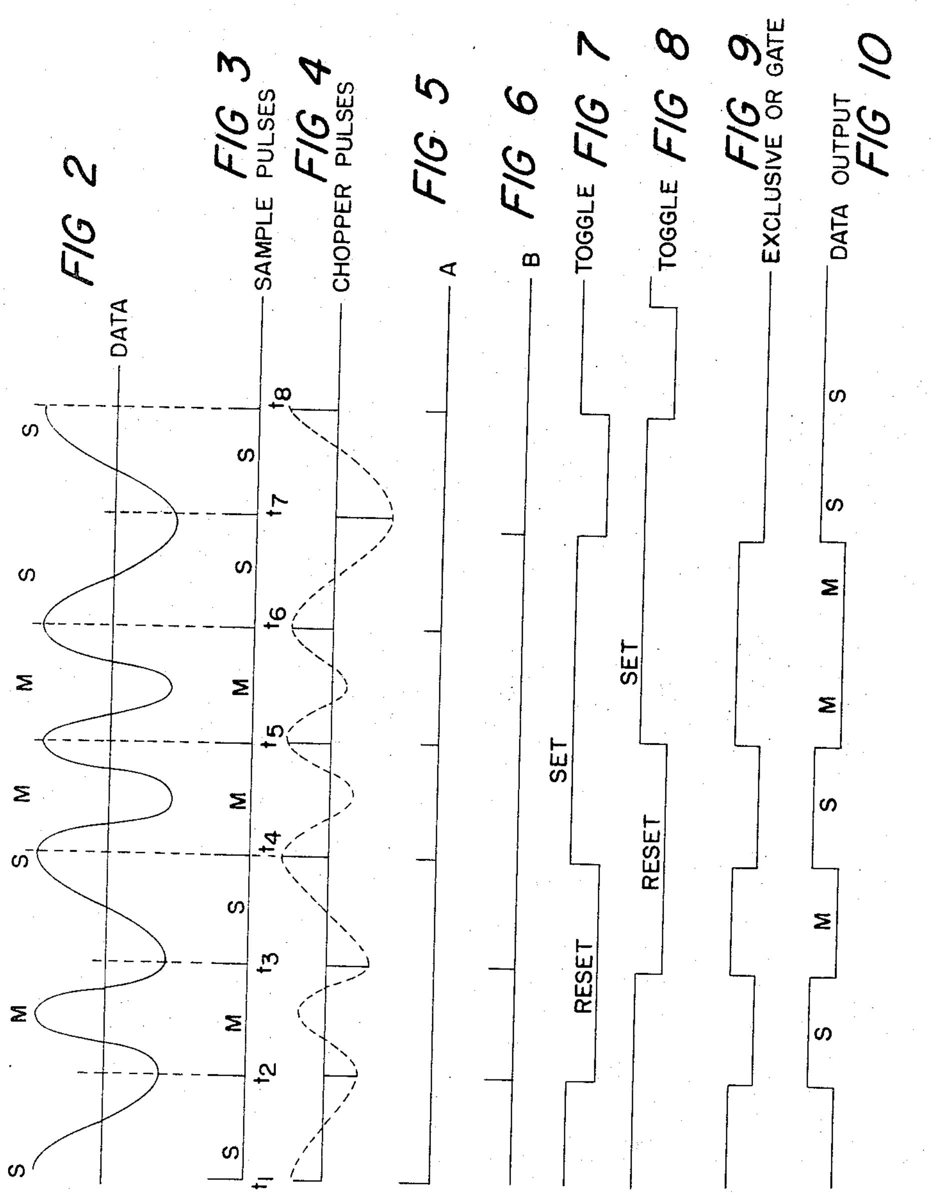
FIG. 2 is a waveform of the received FSK signal.
FIG. 3 shows the sampling pulses derived from the received FSK signal.
FIG. 4 shows the samplings of the received FSK signal.
FIGS. 5 and 6 show the samplings of FIG. 4 separated in accordance with polarity.

FIGS. 7 and 8 show the conditions of the two toggle switches in response to the samplings of FIGS. 5 and 6 being supplied thereto; and FIGS. 9 and 10 show the resultant two-level binary signal with the curve of FIG. 10 being an inversion of the curve of FIG. 9.

Figure 1:
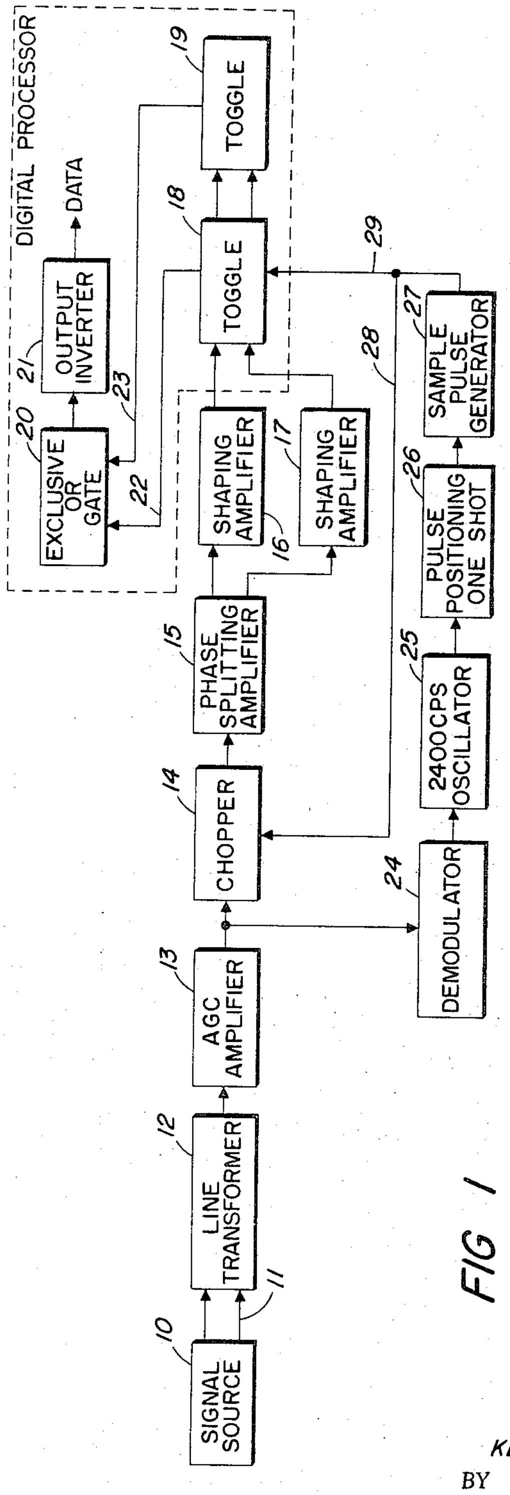
FIG. 1 is a block diagram of the invention.

Referring now to FIG. 1, the FSK signal of FIG. 2 is supplied from source 10 over a suitable transmitting medium such as wire lines 11 to a line transformer 12.

It is to be understood that means other than wire line transmission means can be employed to supply the signal from source 10 to the receiver. The signal can be transmitted through space on a carrier signal, in which case the receiver must be provided with means for recovering the FSK signal from the modulated carrier. In the particular embodiment shown in FIG. 1, a carrier is not required since the signal is transmitted over wire lines, such as telephone lines.

From the line transformer the signal is supplied to an automatic gain control (AGC) amplifier 13 which functions to amplify the signal and to provide a constant level input signal, as shown in FIG. 2. The output of the amplifier 13 is supplied to two circuits substantially in parallel. One of these circuits includes a synchronizing demodulator circuit 24, a 2400 c.p.s. oscillator 25, pulse positioning one-shot multi-vibrator 26, and a sample pulse generator 27. The function of the circuit set forth immediately above is to generate a train of sampling pulses, as shown in FIG. 3, the purpose of which will be described in more detail later herein.

The second circuit to which the output of the amplifier 13 is supplied consists of the gating circuit 14, a phase splitting amplifier 15, shaping amplifiers 16 and 17, and toggle switches 18 and 19 which together form a two-stage shift register. The output of the two toggle switches is supplied to an exclusive OR gate 20 through leads 22 and 23. The OR gate functions as a modulo two adder with its output supplied to inverter circuit 21. The output of inverter circuit 21, shown in FIG. 10, is a two-level signal containing the data in the received FSK signal and having the polarity of the two-level binary signal from which the FSK signal was originally derived.

In the particular circuit of FIG. 1, let it be assumed that the two frequencies being employed to represent marks and spaces are a 2400 c.p.s. signal and a 1200 c.p.s. signal with a full cycle of the 2400 cycle signal representing a mark and a half cycle of the 1200 c.p.s. signal representing the space. Thus, in FIG. 2, for example, the half cycle represented between times $t_1$ and $t_2$ of FIG. 2 is a half cycle of a 1200 c.p.s. signal and represents a space. Similarly, the full cycle of FIG. 2 shown during the time interval $t_2$–$t_3$ is a full cycle of the 2400 c.p.s. signal and represents a mark. It will be observed that the transition between the half-cycle of the 1200 c.p.s. signal and the full cycle of the 2400 c.p.s. signal ocurs at the peak amplitude shown at time $t_2$. It will be noted that at the other times noted, such as times $t_3$, $t_4$, $t_5$, $t_6$, $t_7$, and $t_8$ transfers will occur from one bit to the next succeeding bit which in many cases will be a transfer from one frequency to the other frequency, with all of said transfers ocurring at either a positive or negative peak of the two signals.

Referring again to the sampling pulse generating circuit of FIG. 1, the synchronizing signal demodulator block 24 functions to respond to the waveform of FIG. 2 to produce a 2400 c.p.s. signal. The specific means by which the demodulator 24 of FIG. 1 functions is described in detail in the aforementioned co-pending application, Ser. No. 105,786. The output of the synchronizing signal generator 24 is employed to drive the 2400 c.p.s. oscillator 25. The oscillator 25 is constructed to supply a squarewave output to pulse positioning one-shot circuit 26 which, in essence, is a delaying circuit. More specifically, one shot pulse positioning circuit 26 functions to change the phase of the output of oscillator 25 so that the pulses generated in the sample pulse generator 27 will occur at the optimum sampling times of the FSK waveform of FIG. 2. The optimum sampling times occur when the FSK waveform of FIG. 2 is at its maximum value. Such optimum times are indicated by the time reference characters $t_1$–$t_8$ in FIG. 2.

The sampling pulses of FIG. 3, which are produced at the output of the sample pulse generator 27, are supplied both to the gating circuit 14 and to the toggle switch 18 of FIG. 1. The sampling pulses supplied to the gating circuit 14 function to sample the FSK signal of FIG. 2 during each transition period. FIG. 4 represents the output of the gating circuit 14 and can be seen to consist of a series of negative and positive pulses with the negative pulses resulting from a sampling of the FSK signal during negative peaks and the positive pulses resulting from a sampling of the FSK signal during positive peaks.

The output of gating circuit 14 is supplied to phase split amplifier 15 which separates the positive pulses from the negative pulses and supplies the separated pulses to shaping amplifiers 16 and 17. More specifically, the phase split amplifier 15 supplies the positive pulses to shaping amplifier 16 and inverts the negative pulses and supplies said inverted negative pulses to shaping amplifier 17. The waveforms of FIG. 5 and FIG. 6 represent the pulses supplied to the shaping amplifiers 16 and 17, respectively, from phase splitting amplifier 15.

Shaping amplifiers 16 and 17 amplify and shape the pulses to a suitable magnitude and sharpness. The shaped pulses are then supplied to the two input leads of toggle switch 18, which has a set and a reset position and is, in effect, a two-input flip-flop circuit. For purposes of discussion, assume that a pulse from shaping amplifier 16 will cause toggle switch 18 to assume its set position and a pulse from the shaping amplifier 17 will cause toggle switch 18 to assume its reset position.

The waveform of FIG. 7 represents the state of the toggle switch 18 in response to the FSK signal of FIG. 2 with the upper level of FIG. 7 representing the set condition and the lower level representing the reset condition. Also, the waveform of FIG. 7 represents the signal appearing on the output lead 22 of toggle switch 18.

A second toggle switch or flip-flop circuit 19 is connected to the output terminals of toggle switch 18 and also has two stable states. The two switches 18 and 19 together form a two-stage shift register. Since shift registers are well known in the art, they will not be discussed in detail herein. The condition of toggle switch 18 is shifted to toggle switch 19 by the sampling pulse via lead 29 immediately before the new condition of toggle switch 18 is effected. Consequently, the stage of toggle switch 19 will always be representative of the bit immediately preceding the one currently being received and represented by toggle switch 18. Thus, for example, in FIG. 8, which represents the output of toggle switch 19 on lead 23, the set condition existing during time interval $t_2$–$t_3$ (FIG. 8) was derived from the set condition of the preceding bit contained in toggle switch 18 during the time interval $t_1$–$t_2$. An examination of FIG. 7 and FIG. 8 will show that the waveform of FIG. 8 lags the waveform of FIG. 7 by approximately one data bit interval.

Further, it will be seen from FIGS. 7 and 8 that if the levels of the two signals shown therein are different during any given time interval, then the bit of the preceding time interval was a space, and if the levels of the two signals of FIGS. 7 and 8 are the same during any bit period, that the preceding bit was a mark. For example, during the time intervals $t_2$–$t_3$, the levels of FIGS. 7 and 8 are different so that the preceding bit of time interval $t_1$–$t_2$ was a space. During the time intervals $t_3$–$t_4$ the levels of the two signals of FIGS. 7 and 8 are the same indicating that the preceding bit of time interval $t_2$–$t_3$ was a mark, as is verified in FIG. 2.

The function of the exclusive OR gate 20, also known as a modulo two adder is to produce an output when the levels of the signals on its two input leads 22 and 23 are the same, whether they are low level or high level signals. In FIG. 9 there is shown the waveform of the output of the exclusive OR gate 20 of FIG. 1. It will be noted that the waveform of FIG. 9 is a two-level signal. The circuit is designed so that the upper level of FIG. 9 represents the occurrence of similar levels on input leads 22 and 23 of OR gate 20, and the lower level of FIG. 9 represents the occurrence of dissimilar levels on input leads 22 and 23. Due to the design of the OR gate 20, the output thereof happens to be an inversion of the original two-level binary signal from which the FSK signal from source 10 was derived at the transmitter end of the system which is not described herein. Consequently, it is necessary to invert the waveform of FIG. 9 by means of inverter 21 of FIG. 1. The output of inverter 21 is shown in FIG. 10 and represents the original two-level binary signal from which the FSK signal was derived.

It is to be noted that the form of the invention shown and described herein is but a preferred embodiment thereof and that various changes may be made in circuit arrangement without departing from the spirit or the scope thereof.

I claim:

1. In a communication system employing a time synchronous data carrying signal in which a half wave cycle of a signal of frequency $f_1$ represents a binary bit "0," in which a full wave cycle of a signal of frequency $2f_1$ represents a binary bit "1," in which the peak amplitude of said half and full wave cycles are substantially equal, and in which the transition from any given data bit to the next data bit always occurs at the peak amplitudes of the half and full wave cycles;

demodulating means comprising:

means for sampling the received data carrying signal substantially at each bit transition time to produce a serial train of pulses consisting of positive pulses of substantially constant amplitude and negative pulses of substantially constant amplitude, one of said positive or negative pulses occurring at each sampling time to indicate the polarity of the received data signal;

pulse separating means comprising first and second output terminal means and constructed to supply all of said positive pulses to said first output terminal means and all of said negative pulses to said second output terminal means with the same time spacing said pulses maintained in said train of pulses;

shift register means having a first stage and a second stage with each stage having a set and reset state;

said first stage responsive to output pulses appearing on said first and second output terminal means of said pulse separating means to assume its reset and its set condition, respectively;

said shift register means further constructed to shift the state of said first stage into said second stage one bit period after the state of said first stage is effected;

and exclusive OR circuit means responsive to the states of the stages of said shift register means to produce a two-level binary signal representative of the data contained in the received data carrying signal.

2. Demodulating means in accordance with claim 1 in which said means for sampling the received data carrying signal comprises:

synchronizing signal generating means responsive to said received data carrying signal to produce a signal having a frequency equal to the bit rate of said received data carrying signal;

and means responsive to said synchronizing signal to generate sampling pulses.

3. In a communication system employing a time synchronous data carrying signal in which a half wave cycle of a signal of frequency $f_1$ represents a binary bit "0," in which a full wave cycle of a signal of frequency $2f_1$ represents a binary bit "1," in which the peak amplitudes of said half and full wave cycles are substantially equal, and in which the transition from any given data bit to the next data bit always occurs at the peak amplitudes of the half and full wave cycles;

demodulating means comprising:

means for sampling the received data carrying signal substantially at each bit transition time to produce a train of pulses consisting of positive pulses of substantially constant amplitude and negative pulses of substantially constant amplitude, one of said positive or negative pulses occurring at each sampling time to indicate the polarity of the received data signal;

pulse separating means comprising first and second output terminal means and constructed to supply all of said positive pulses to said first output terminal means and all of said negative pulses to said second output terminal means with the same time spacing said pulses maintained in said train of pulses;

first bistable means having set and reset input and output terminal and responsive to the separated positive and negative sampled pulses from said pulse separating means to assume set and reset conditions accordingly;

second bistable means having set and reset input terminals and set output terminal means and responsive to the output signals of said first bistable means to assume the same conditions as said first bistable means but delayed by one bit period;

and exclusive OR circuit means responsive to the set output signals of said first and second bistable means to produce a two-level signal binary representation of the received data with one level thereof representing binary "0's" and the other level thereof representing binary "1's."

4. Demodulating means in accordance with claim 3 in which said means for sampling the received data carrying signal comprises:

synchronizing signal generating means responsive to said received data carrying signal to produce a synchronizing signal having a frequency equal to the bit rate of said received data carrying signal, and means responsive to said synchronizing signal to generate sampling pulses.

References Cited

UNITED STATES PATENTS

| | | | |
|---|---|---|---|
| 2,939,914 | 6/1960 | Ingham | 178—67 |
| 3,238,299 | 3/1966 | Lender | 178—68 |
| 3,112,448 | 11/1963 | McFarlane et al. | 178—66 X |

ROBERT L. GRIFFIN, *Primary Examiner.*

DAVID G. REDINBAUGH, JOHN W. CALDWELL, *Examiners.*

W. S. FROMMER, *Assistant Examiner.*